(12) United States Patent
Ohnuma

(10) Patent No.: US 9,437,938 B2
(45) Date of Patent: Sep. 6, 2016

(54) CONNECTING STRUCTURE OF PRESSURE ATTACHING TERMINAL TO ELECTRIC WIRE AND CONNECTING METHOD OF PRESSURE ATTACHING TERMINAL TO ELECTRIC WIRE

(71) Applicant: Yazaki Corporation, Tokyo (JP)

(72) Inventor: Kentaro Ohnuma, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 26 days.

(21) Appl. No.: 14/191,775

(22) Filed: Feb. 27, 2014

(65) Prior Publication Data

US 2014/0174820 A1 Jun. 26, 2014

Related U.S. Application Data

(63) Continuation of application No. PCT/JP2012/072661, filed on Aug. 30, 2012.

(30) Foreign Application Priority Data

Aug. 30, 2011 (JP) .................................. 2011-187630

(51) Int. Cl.
*H01R 4/00* (2006.01)
*H01R 4/18* (2006.01)
(Continued)

(52) U.S. Cl.
CPC .............. *H01R 4/184* (2013.01); *H01R 4/185* (2013.01); *H01R 4/26* (2013.01); *H01R 4/62* (2013.01); *H02G 1/14* (2013.01); *Y10T 29/49181* (2015.01)

(58) Field of Classification Search
CPC ........ H01R 4/184; H01R 4/26; H01R 4/185; H01R 4/62; H01R 13/5205; Y10T 29/49181; H02G 15/013
USPC ............. 174/74 R, 84 C; 439/877, 865, 442; 29/861
See application file for complete search history.

(56) References Cited

U.S. PATENT DOCUMENTS 3,831,132 A * 8/1974 Bowden, Jr. ........... H01R 4/188
439/442
3,949,466 A * 4/1976 O'Brien .................. H01R 4/62
174/94 R
(Continued)

FOREIGN PATENT DOCUMENTS

CN 101842940 A 9/2010
CN 102077424 A 5/2015
(Continued)

OTHER PUBLICATIONS

Office Action and Search Report from the State Intellectual Property Office of the People's Republic of China. Dated Jun. 30, 2015 in counterpart Application No. 201280041726.9.

(Continued)

*Primary Examiner* — Timothy Thompson
*Assistant Examiner* — Guillermo Egoavil
(74) *Attorney, Agent, or Firm* — Sughrue Mion, PLLC

(57) ABSTRACT

In a connecting method of a pressure attaching terminal to an electric wire, the pressure attaching terminal includes first and second electric wire connecting parts having U shapes and having a bottom plate part and one pairs of electric wire caulking pieces. When the electric wire is a single core electric wire, a single core conductor is set and one pairs of electric wire caulking pieces are respectively bent inside to caulk the caulking pieces to the single core conductor. When the electric wire is a multi-core electric wire as a multi-core twisted conductor, the multi-core conductor is set, and the one pair of electric wire caulking pieces are bent inside to caulk the electric wire caulking pieces to the multi-core conductor, and the one pair of electric wire caulking pieces are bent inside to caulk the electric wire caulking pieces to the part covered with a coat.

5 Claims, 2 Drawing Sheets

(51) Int. Cl.
*H01R 4/26* (2006.01)
*H01R 4/62* (2006.01)
*H02G 1/14* (2006.01)

(56) References Cited

U.S. PATENT DOCUMENTS

| | | | |
|---|---|---|---|
| 4,229,063 A | 10/1980 | Yoshizawa | |
| 4,581,820 A * | 4/1986 | Zahn | H01R 11/05 174/84 C |
| 5,653,607 A * | 8/1997 | Saka | H01R 9/2458 439/402 |
| 6,086,413 A * | 7/2000 | Karasik | H01R 13/405 439/516 |
| 7,306,495 B2 | 12/2007 | Hashimoto et al. | |
| 8,070,536 B2 | 12/2011 | Ono et al. | |
| 2004/0142607 A1* | 7/2004 | Asakura | H01R 43/0221 439/877 |
| 2010/0230160 A1* | 9/2010 | Ono | H01R 4/185 174/84 C |
| 2010/0261391 A1* | 10/2010 | Ono | H01R 4/185 439/877 |
| 2011/0045713 A1 | 2/2011 | Ono et al. | |
| 2011/0124247 A1* | 5/2011 | Okamura | H01R 4/188 439/877 |
| 2012/0318575 A1* | 12/2012 | Koto | H01R 4/72 174/84 C |
| 2013/0225014 A1* | 8/2013 | Sato | H01R 4/70 439/736 |

FOREIGN PATENT DOCUMENTS

| | | |
|---|---|---|
| JP | 52-001489 A | 1/1977 |
| JP | 6-31072 U | 4/1994 |
| JP | 07-041977 U | 7/1995 |
| JP | 2000-077156 A | 3/2000 |

OTHER PUBLICATIONS

Office Action dated Jun. 2, 2015, issued by the Japanese Patent Office in counterpart Japanese Application No. 2011-187630.
International Search Report dated Dec. 3, 2012, issued by the International Searching Authority in counterpart International Application No. PCT/JP2012/072661.
Written Opinion dated Dec. 3, 2012, issued by the International Searching Authority in counterpart International Application No. PCT/JP2012/072661.
Office Action dated Dec. 24, 2015, issued by the State Intellectual Property Office of P.R. China in counterpart Chinese Application No. 201280041726.9.

* cited by examiner

US 9,437,938 B2

CONNECTING STRUCTURE OF PRESSURE ATTACHING TERMINAL TO ELECTRIC WIRE AND CONNECTING METHOD OF PRESSURE ATTACHING TERMINAL TO ELECTRIC WIRE

CROSS REFERENCE TO RELATED APPLICATIONS

This application is a continuation of PCT application No. PCT/JP2012/072661, which was filed on Aug. 30, 2012 based on Japanese patent application (patent application 2011-187630) filed on Aug. 30, 2011, whose contents are incorporated herein by reference. Also, all the references cited herein are incorporated as a whole.

BACKGROUND OF THE INVENTION

1. Technical Field

The present invention relates to a connecting structure and a connecting method of a pressure attaching terminal to an electric wire.

2. Background Art

As an electric wire to which a terminal is attached under pressure, a multi-core electric wire having many core wires twisted together is ordinarily used (for instance, see JP-UM-A-6-31072). However, a problem arises that as a sectional area of a conductor is larger, the number of the core wires to be used is increased in the multi-core electric wire, so that a cost is high. Accordingly, for the electric wire used in a part which does not require a bending property, an inexpensive single core electric wire is desired to be used in place of the multi-core electric wire.

FIGS. 2A to 2C are diagrams for explaining a usual problem when a terminal is attached under pressure to a single core electric wire. FIG. 2A is a sectional view showing a state before the terminal is attached under pressure to the single core electric wire. FIG. 2B is a sectional view showing a state after the terminal is attached under pressure to the single core electric wire. FIG. 2C is a sectional view showing a state that a pressure attached part creeps by receiving a repeated load of high temperature and low temperature.

In FIG. 2A to FIG. 2C, reference numeral 10A designates a single core electric wire, 11A designates a single core conductor and 12 designates a coat which covers the single core conductor 11A. Further, reference numeral 20 designates a pressure attaching terminal, 21 designates a bottom plate part, 22 designates an electric wire connecting part and 22a designates an electric wire caulking piece. As shown in FIG. 2A, the pressure attaching terminal 20 has, in its front part, an electric connecting part (an illustration is omitted) connected to a mate side terminal, and in its rear part, the electric wire connecting part 22 formed substantially in the shape of U in section and including the bottom plate part 21 and one pair of electric wire caulking pieces 22a which are extended upward from both side edges of the bottom plate part 21 and bent inside to enclose a terminal part of the electric wire to be connected so that the electric wire caulking pieces caulk the terminal part of the electric wire so as to come into close contact with an upper surface of the bottom plate part 21.

When the pressure attaching terminal 20 is connected to the single core electric wire 10A, as shown in FIG. 2B, the signal core conductor 11A exposed by removing the coat 12 is set on the bottom plate part 21 of the electric wire connecting part 22. Under this state, the one pair of electric wire caulking pieces 22a of the electric wire connecting part 22 are bent inside to caulk the single core conductor 11A. Thus, the pressure attaching terminal 20 is attached under pressure and fixed to the terminal part of the single core electric wire 10A.

SUMMARY

When the electric wire connecting part 22 of the pressure attaching terminal 20 is caulked to the single core electric wire 10A, since the conductor 11A of the electric wire is a single core, a pressure attaching load is hardly dispersed. As a result, a problem arises that contact pressure is concentrated on a part A and a part B shown in FIG. 2B, and the contact pressure is low in parts C. Here, the part A is an upper part of a pressure attaching part in section in which both ends of the one pair of electric caulking pieces 22a rub against each other and bite and the contact pressure is extremely high. Further, the part B is a contact part of the bottom plate part 21 opposed to the part A in which the contact pressure is high, though it is not so high as that of the part A. Further, the parts C are both side parts of the pressure attaching part in section in which the contact pressure is low.

A problem arises that such a contact pressure changes when the single core conductor 11A or the pressure attaching terminal 20 creeps under an environment that a high temperature and a low temperature are repeated to lower the contact pressure in the part A or the part B in which the contact pressure is high, so that a contact resistance of the electric wire and the terminal is increased in the pressure attaching part.

The present invention is devised by considering the above-described circumstances and it is an object of the present invention to provide a connecting structure and a connecting method of a pressure attaching terminal to an electric wire which increases a contact area in a pressure attaching part so that a contact resistance of a terminal and an electric wire may be reduced, and accordingly, a reliability in an electric connection may be improved.

The above-described object of the present invention is achieved by below-described structures.

(1) A connecting structure of a pressure attaching terminal to an electric wire, the pressure attaching terminal comprising:

an electric connecting part connected to a mate side terminal in a front part of the pressure attaching terminal; and first and second electric wire connecting parts formed substantially in the shapes of U in section in a rear part of the pressure attaching terminal and including a bottom plate part and one pairs of electric wire caulking pieces which are extended upward from both side edges of the bottom plate part and bent inside to enclose a terminal part of the electric wire to be connected so that the electric wire caulking pieces caulk the terminal part of the electric wire so as to come into close contact with an upper surface of the bottom plate part, the bottom plate part of the first and second electric wire connecting parts being common and the electric wire caulking pieces of the first electric wire connecting part and the electric wire caulking pieces of the second electric wire connecting part being spaced apart from each other in respectively independent states in a longitudinal direction of the pressure attaching terminal, wherein the pressure attaching terminal is adapted to be connected in common with a single core electric wire having a conductor covered with a coat as a single core conductor and a multi-core electric wire having a conductor covered with a coat as a multi-core conductor, in the case that the electric wire is formed with the single core electric wire, the single core conductor exposed by removing the coat is set on the bottom plate part common to the first and second electric wire connecting parts, and the one pairs of electric wire caulking pieces of the first and second electric wire connecting parts are respectively bent inside to caulk the caulking pieces to the single core conductor together to attach the terminal under pressure and fixed to a terminal part of the electric wire, and in the case that the electric wire is formed with the multi-core electric wire, the multi-core conductor exposed by removing the coat is set on the bottom plate part of the first electric wire connecting part, and the one pair of electric wire caulking pieces of the first electric wire connecting part are bent inside to caulk the electric wire caulking pieces to the multi-core conductor, a part covered with the coat is set on the bottom plate part of the second electric wire connecting part, and the one pair of electric wire caulking pieces of the second electric wire connecting part are bent inside to caulk the electric wire caulking pieces to the part covered with the coat and to attach under pressure and fix the terminal to the terminal part of the electric wire.

(2) A connecting structure of a pressure attaching terminal to an electric wire according to the above (1), wherein the single core electric wire is formed with an aluminum single core electric wire having a conductor covered with a coat as an aluminum single core conductor.

(3) A connecting method of a pressure attaching terminal to an electric wire, the pressure attaching terminal comprising:

an electric connecting part connected to a mate side terminal in a front part of the pressure attaching terminal; and first and second electric wire connecting parts formed substantially in the shapes of U in section in a rear part of the pressure attaching terminal and including a bottom plate part and one pairs of electric wire caulking pieces which are extended upward from both side edges of the bottom plate part and bent inside to enclose a terminal part of the electric wire to be connected so that the electric wire caulking pieces caulk the terminal part of the electric wire so as to come into close contact with an upper surface of the bottom plate part, the bottom plate part of the first and second electric wire connecting parts being common and the electric wire caulking pieces of the first electric wire connecting part and the electric wire caulking pieces of the second electric wire connecting part being spaced apart from each other in respectively independent states in a longitudinal direction of the pressure attaching terminal, wherein the pressure attaching terminal is adapted to be connected in common with a single core electric wire having a conductor covered with a coat as a single core conductor and a multi-core electric wire having a conductor covered with a coat as a multi-core conductor, in the case that the electric wire is formed with the single core electric wire, the single core conductor exposed by removing the coat is set on the bottom plate part common to the first and second electric wire connecting parts, and then, the one pairs of electric wire caulking pieces of the first and second electric wire connecting parts are respectively bent inside to caulk the caulking pieces to the single core conductor together and to attach under pressure and fix the terminal to a terminal part of the electric wire, and when the electric wire is formed with the multi-core electric wire, the multi-core conductor exposed by removing the coat is set on the bottom plate part of the first electric wire connecting part, and then, the one pair of electric wire caulking pieces of the first electric wire connecting part are bent inside to caulk the electric wire caulking pieces to the multi-core conductor, a part covered with the coat is set on the bottom plate part of the second electric wire connecting part, and then the one pair of electric wire caulking pieces of the second electric wire connecting part are bent inside to caulk the electric wire caulking pieces to the part covered with the coat and to attach under pressure and fix the terminal to the terminal part of the electric wire.

(4) A connecting method of a pressure attaching terminal to an electric wire according to the above (3), wherein the single core electric wire is formed with an aluminum single core electric wire having a conductor covered with a coat as an aluminum single core conductor.

According to the connecting structure of a pressure attaching terminal to an electric wire having the structure of the above-described (1), since not only the electric wire caulking pieces of the first electric wire connecting part, but also the electric wire caulking pieces of the second electric wire connecting part are caulked to the single core conductor of the electric wire, a contact area of the conductor of the electric wire and the pressure attaching terminal can be increased. Even in the case of the single core electric wire lower in its flexibility than the multi-core electric wire, reliability in an electric connection of the electric wire and the pressure attaching terminal can be improved. Further, the electric wire caulking pieces of the first electric wire connecting part and the electric wire caulking pieces of the second electric wire connecting part of the rear side thereof are independent of and separated from each other. Accordingly, when the electric wire caulking pieces are respectively caulked to the single core conductor, a stress applied to the pressure attaching terminal can be clearly dispersed. Thus, a strong pressure attaching strength can be maintained respectively in the first and second electric wire connecting parts. The reliability in electric connection of the electric wire and the terminal can be improved from this point of view.

According to the connecting structure of a pressure attaching terminal to an electric wire having the structure of the above-described (2), since the aluminum single core electric wire is used as the electric wire to which the pressure attaching terminal is connected, the aluminum single core electric wire is lighter than a copper electric wire and the above-described effects can be achieved at the same time. Further, when the terminal is made of copper relative to the aluminum conductor of the electric wire, a plating of a material having an intermediate potential of aluminum and copper such as an iron type material or a nickel type material is ordinarily interposed on the surface of the conductor of the electric wire or the surface of the terminal from the viewpoint of prevention of electric erosion. However, even when the plating peels off due to an aged deterioration, since the contact area of the conductor of the electric wire and the terminal is increased, the reliability in electric connection can be maintained.

According to the connecting method of a pressure attaching terminal to an electric wire having the structure of the above-described (3), when the electric wire to be connected is the single core electric wire, the electric wire caulking pieces of both the first and second electric wire connecting parts are caulked together to the single core conductor of the electric wire. When the electric wire to be connected is the multi-core electric wire, the electric wire caulking pieces of the first electric wire connecting part of the front side are caulked to the multi-core conductor of the electric wire and the electric wire caulking pieces of the second electric wire connecting part of the rear side are caulked to the part of the electric wire covered with the coat. Accordingly, when the pressure attaching terminal of the one kind is properly used, optimum connecting states to the electric wires can be respectively formed depending on the kinds of the electric wires.

According to the connecting method of a pressure attaching terminal to an electric wire having the structure of the above-described (4), since the aluminum single core electric wire is used as the single core electric wire, the aluminum single core electric wire is lighter than a copper electric wire and the above-described effects can be achieved at the same time. Further, when the terminal is made of copper relative to the aluminum conductor of the electric wire, a plating of a material having an intermediate potential such as iron or nickel is ordinarily interposed on the surface of the conductor of the electric wire or the surface of the terminal from the viewpoint of prevention of electric erosion. However, even when the plating peels off due to an aged deterioration, since the contact area of the conductor of the electric wire and the terminal is increased, the reliability in electric connection can be maintained.

According to the present invention, the contact area of the conductor and the terminal can be increased in the part of the terminal attached under pressure to the single core conductor of the electric wire, so that a contact resistance of the terminal and the electric wire can be reduced to improve the reliability in electric connection.

BRIEF DESCRIPTION OF THE DRAWINGS

FIG. 1A is a perspective view showing a structure of a part in which a pressure attaching terminal is connected to a single core electric wire. FIG. 1B is a perspective view showing a structure of a part in which a pressure attaching terminal is connected to a multi-core electric wire.

FIG. 2A is a sectional view showing a state before the terminal is attached under pressure to the single core electric wire. FIG. 2B is a sectional view showing a state after the terminal is attached under pressure to the single core electric wire. FIG. 2C is a sectional view showing a state that a pressure attached part creeps by receiving a repeated load of high temperature and low temperature.

DETAILED DESCRIPTION OF EMBODIMENTS

Figure 1A:
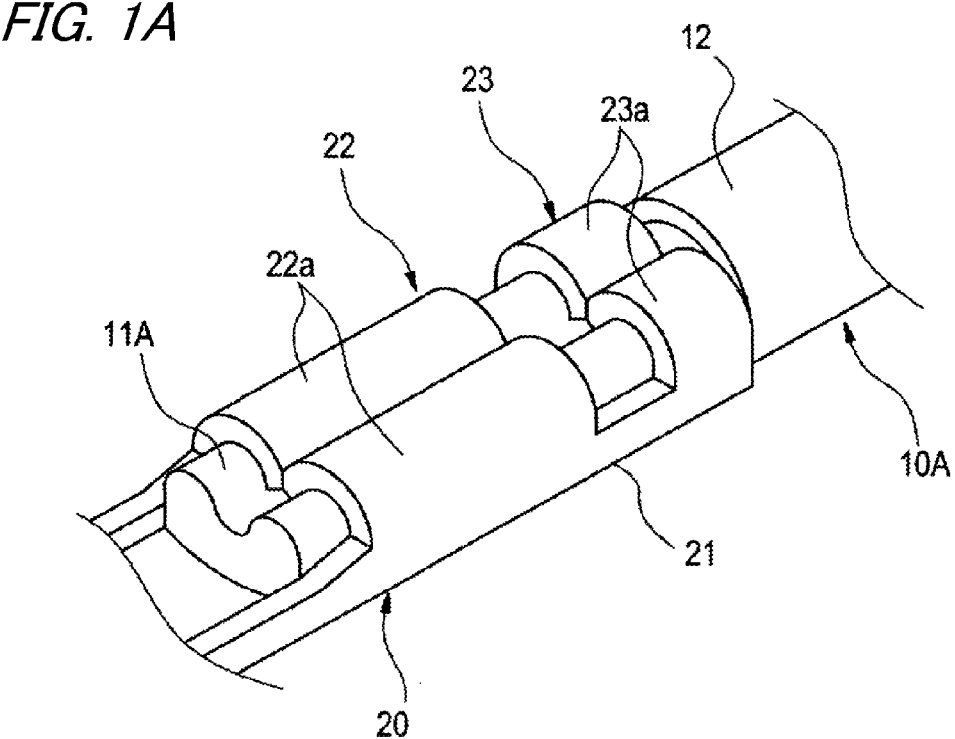
FIGS. 1A and 1B are explanatory views of an exemplary embodiment of the present invention.

Now, an exemplary embodiment of the present invention will be described below by referring to the drawings.

Figure 1B:
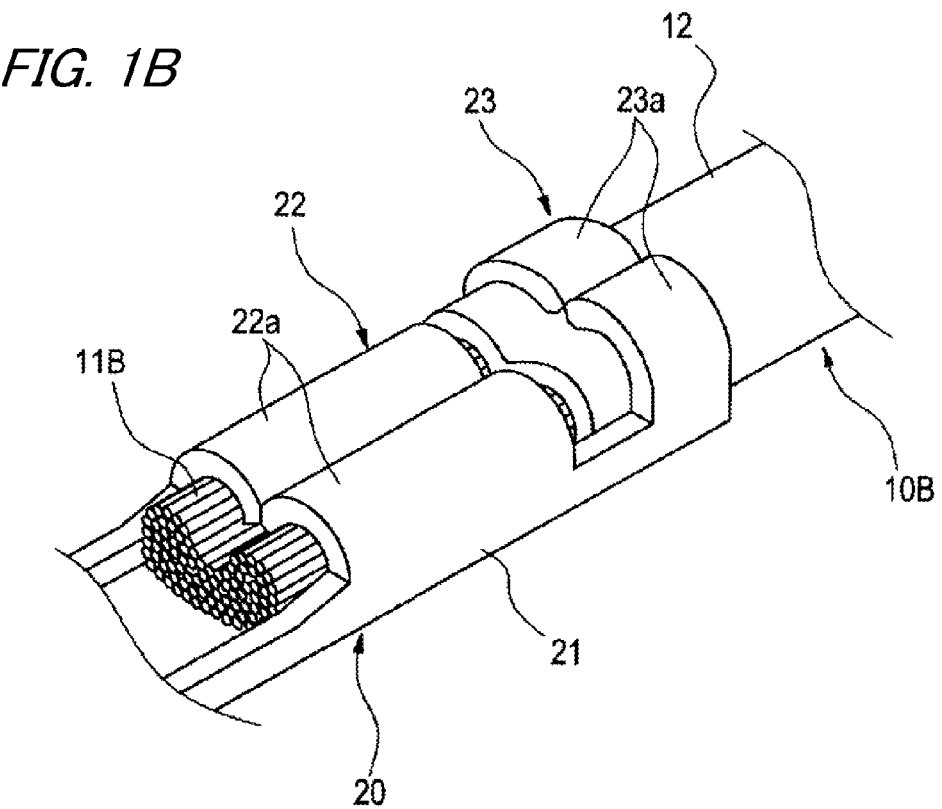

FIGS. 1A and 1B are explanatory views of the exemplary embodiment. FIG. 1A is a perspective view showing a structure of a part in which a pressure attaching terminal is connected to a single core electric wire. FIG. 1B is a perspective view showing a structure of a part in which a pressure attaching terminal is connected to a multi-core electric wire.

Figure 2A:
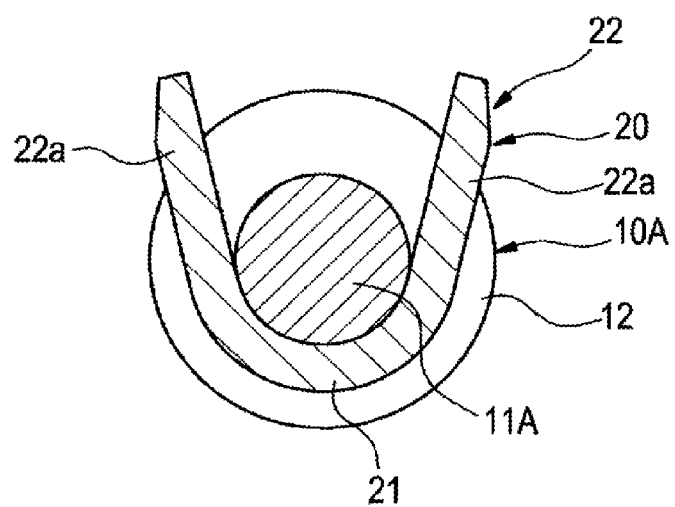
FIGS. 2A to 2C are diagrams for explaining a usual problem when a terminal is attached under pressure to a single core electric wire.
Figure 2B:
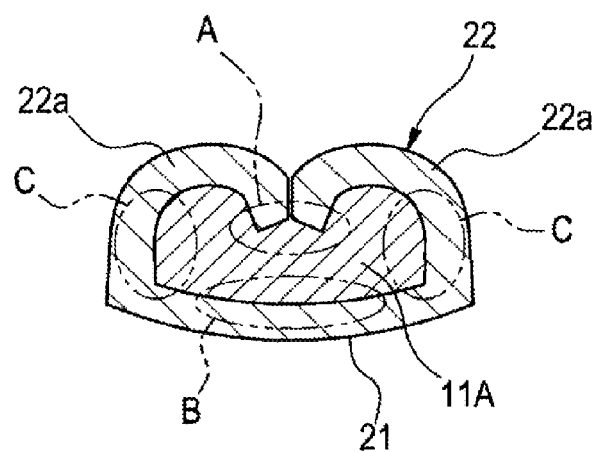
Figure 2C:
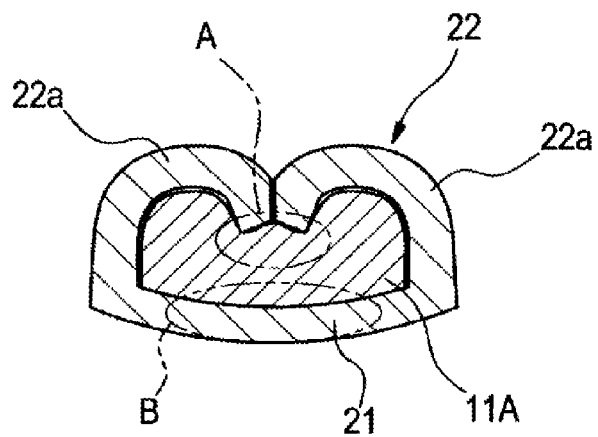

The pressure attaching terminal 20 used in the present exemplary embodiment has, in its front part, an electric connecting part (an illustration is omitted) connected to a mate side terminal, and in its rear part, two first and second electric wire connecting parts 22 and 23 formed substantially in the shapes of U in section and including a bottom plate part 21 and one pairs of electric wire caulking pieces 22a and 23a which are extended upward from both side edges of the bottom plate part 21 and bent inside to enclose a terminal part of the electric wire to be connected so that the electric wire caulking pieces caulk the terminal part of the electric wire so as to come into close contact with an upper surface of the bottom plate part 21. Sectional forms of the electric wire connecting parts 22 and 23 are respectively set to the same form as that shown in FIG. 2A. In this case, the two electric wire connecting parts, that is, the first and second electric wire connecting parts 22 and 23 have in common the bottom plate part 21. The electric wire caulking pieces 22a of the first electric wire connecting part 22 and the electric wire caulking pieces 23a of the second electric wire connecting part 23 are spaced apart from each other in respectively independent states in a longitudinal direction.

Then, the pressure attaching terminal 20 of one kind is used in common irrespective of the kind of the electric wire (a single core or a multi-core). As shown in FIG. 1A, when the electric wire is formed with a single core electric wire 10A having a conductor covered with a coat 12 as a single core conductor 11A, the single core conductor 11A exposed lengthily by removing the coat 12 is set on a range from an upper part of the bottom plate part 21 of the first electric wire connecting part 22 of a front side to an upper part of the bottom plate part 21 of the second electric wire connecting part 23 of a rear side. Under this state, the one pairs of electric wire caulking pieces 22a and 23a of the first and second electric wire connecting parts 22 and 23 are respectively bent inside to caulk the electric wire connecting pieces to the single core conductor 11A together. Thus, the terminal 20 is attached under pressure and fixed to the terminal part of the electric wire 10A.

Further, as shown in FIG. 1B, when the electric wire is formed with a multi-core electric wire 10B having a conductor covered with a coat 12 as a multi-core conductor 11B, the multi-core conductor 11B exposed by removing the coat 12 is set on the bottom plate part 21 of the first electric wire connecting part 22 of the front side. Under this state, the one pair of electric wire caulking pieces 22a of the first electric wire connecting part 22 are bent inside to caulk the electric wire caulking pieces to the multi-core conductor 11B. Further, a part covered with the coat 12 is set on the bottom plate part 21 of the second electric wire connecting part 23. Under this state, the one pair of electric wire caulking pieces 23a of the second electric wire connecting part 23 are bent inside to caulk the electric wire caulking pieces to the part covered with the coat 12. Thus, the terminal 20 is attached under pressure and fixed to the terminal part of the multi-core electric wire 10B.

Here, especially as the single core electric wire 10A, an aluminum single core electric wire is used which has an aluminum single core conductor (for instance, an aluminum single wire of 15 sq). Since this aluminum single core electric wire has little bending property, the aluminum single core electric wire is used in a part which does not need to be bent.

According to the present exemplary embodiment, when the electric wire to be connected is the single core electric wire 10A as shown in FIG. 1A, the electric wire caulking pieces 22a and 23a of both the first and second electric wire connecting parts 22 and 23 are caulked together to the single core conductor 11A of the electric wire 10A. When the electric wire to be connected is the multi-core electric wire 10B as shown in FIG. 1B, the electric wire caulking pieces 22a of the first electric wire connecting part 22 of the front side are caulked to the multi-core conductor 11B of the electric wire 10B and the electric wire caulking pieces 23a of the second electric wire connecting part 23 of the rear side are caulked to the part of the electric wire 10B covered with the coat 12. Accordingly, when the pressure attaching terminal 20 of the one kind is properly used, optimum connecting states to the electric wires can be respectively formed depending on the kinds of the electric wires.

Especially, when the electric wire to be connected is the single-core electric wire 10A, since not only the electric wire caulking pieces 22a of the first electric wire connecting part 22, but also the electric wire caulking pieces 23a of the second electric wire connecting part 23 are caulked to the single core conductor 11A of the electric wire 10A, a contact area of the single core conductor 11A of the electric wire 10A and the pressure attaching terminal 20 can be increased. Even in the case of the single core electric wire 10A lower in its flexibility than the multi-core electric wire 10B, reliability in an electric connection of the electric wire 10A and the pressure attaching terminal 20 can be improved. Further, the electric wire caulking pieces 22a of the first electric wire connecting part 22 and the electric wire caulking pieces 23a of the second electric wire connecting part 23 of the rear side thereof are independent of and separated from each other. Accordingly, when the electric wire caulking pieces 22a and 23a are respectively caulked to the single core conductor 11A, a stress applied to the pressure attaching terminal 20 can be clearly dispersed. Thus, a strong pressure attaching strength can be maintained respectively in the first and second electric wire connecting parts 22 and 23. The reliability in electric connection of the electric wire 10A and the terminal 20 can be improved from this point of view. Further, since a kind of the pressure attaching terminal is unified to one kind irrespective of the kinds of the electric wires, a mold of the terminal 20 does not need to be prepared in accordance with the kinds of the electric wire.

Further, when the aluminum single core electric wire 10A is used as the electric wire to which the pressure attaching terminal 20 is connected, the aluminum single core electric wire is lighter than a copper electric wire and the above-described effects can be achieved at the same time. Further, when the terminal is made of copper relative to the aluminum conductor of the electric wire, a plating of a material having an intermediate potential of aluminum and copper such as an iron type material or a nickel type material is ordinarily interposed on the surface of the conductor of the electric wire or the surface of the terminal from the viewpoint of prevention of electric erosion. However, even when the plating peels off due to an aged deterioration, since the contact area of the conductor of the electric wire and the terminal is increased, the reliability in electric connection can be maintained.

Further, since the first electric wire caulking pieces 22a of the first electric wire connecting part 22 is separated from the electric wire caulking pieces 23a of the second electric wire connecting part 23 each other, when the terminal is connected to the multi-core electric wire 10B, a waterproof plug can be caulked together with the coat 12 by the electric wire caulking pieces 23a of the second electric wire connecting part 23.

In the specification, the aluminum and aluminum alloy are abbreviated and described simply as "aluminum" and the copper and copper alloy are abbreviated and described simply as "copper".

Further, the present invention is not limited to the above-described exemplary embodiment and may be suitably modified and improved. In addition thereto, materials, forms, dimensions, numbers, arranged positions or the like of component elements in the above-described exemplary embodiment which can achieve the present invention may be respectively arbitrarily used and are not limited.

The present invention is useful for providing a connecting structure and a connecting method of a pressure attaching terminal to an electric wire capable of increasing a contact area in a pressure attaching part so that a contact resistance of a terminal and an electric wire may be reduced, and accordingly, a reliability in an electric connection may be improved.

What is claimed is:

1. A connecting structure of a pressure attaching terminal to an electric wire, the pressure attaching terminal comprising:

a terminal connecting part connected to a mate side terminal in a front part of the pressure attaching terminal; and first and second electric wire connecting parts formed substantially in the shapes of U in section in a rear part of the pressure attaching terminal and including a bottom plate part and respective first and second pairs of electric wire caulking pieces which are extended upward from both side edges of the bottom plate part and bent inside to enclose a terminal part of the electric wire to be connected so that the electric wire caulking pieces caulk the terminal part of the electric wire so as to come into close contact with an upper surface of the bottom plate part, the bottom plate part of the first and second electric wire connecting parts being common and the first pair of electric wire caulking pieces of the first electric wire connecting part and the second pair of electric wire caulking pieces of the second electric wire connecting part being spaced apart from each other in respectively independent states in a longitudinal direction of the pressure attaching terminal, wherein the pressure attaching terminal is configured to be connected in common with both a single core electric wire used in a part which does not need to be bent having a conductor covered with a coat as a single core conductor and a multi-core electric wire having a conductor covered with a coat as a multi-core conductor, in the case that the electric wire is formed with the single core electric wire, the single core conductor exposed by removing the coat is set on the bottom plate part common to the first and second electric wire connecting parts, and the first and second pairs of electric wire caulking pieces of the first and second electric wire connecting parts are respectively bent inside to caulk the caulking pieces to the single core conductor together to attach the terminal under pressure and fixed to a terminal part of the electric wire, and in the case that the electric wire is formed with the multi-core electric wire, the multi-core conductor exposed by removing the coat is set on the bottom plate part of the first electric wire connecting part, and the first pair of electric wire caulking pieces of the first electric wire connecting part are bent inside to caulk the electric wire caulking pieces to the multi-core conductor, a part covered with the coat is set on the bottom plate part of the second electric wire connecting part, and the second pair of electric wire caulking pieces of the second electric wire connecting part are bent inside to caulk the electric wire caulking pieces to the part covered with the coat and to attach under pressure and fix the terminal to the terminal part of the electric wire.

2. A connecting structure of a pressure attaching terminal to an electric wire according to claim 1, wherein the single core electric wire is formed with an aluminum single core electric wire having a conductor covered with a coat as an aluminum single core conductor.

3. A connecting method of a pressure attaching terminal to an electric wire, the pressure attaching terminal comprising:
- a terminal connecting part connected to a mate side terminal in a front part of the pressure attaching terminal; and
- first and second electric wire connecting parts formed substantially in the shapes of U in section in a rear part of the pressure attaching terminal and including a bottom plate part and respective first and second pairs of electric wire caulking pieces which are extended upward from both side edges of the bottom plate part and bent inside to enclose a terminal part of the electric wire to be connected so that the electric wire caulking pieces caulk the terminal part of the electric wire so as to come into close contact with an upper surface of the bottom plate part,
- the bottom plate part of the first and second electric wire connecting parts being common and the first pair of electric wire caulking pieces of the first electric wire connecting part and the second pair of electric wire caulking pieces of the second electric wire connecting part being spaced apart from each other in respectively independent states in a longitudinal direction of the pressure attaching terminal,
- wherein the pressure attaching terminal is configured to be connected in common with both a single core electric wire having a conductor covered with a coat as a single core conductor and a multi-core electric wire having a conductor covered with a coat as a multi-core conductor,
- in the case that the electric wire is formed with the single core electric wire, the single core conductor exposed by removing the coat is set on the bottom plate part common to the first and second electric wire connecting parts, and then, the first and second pairs of electric wire caulking pieces of the first and second electric wire connecting parts are respectively bent inside to caulk the caulking pieces to the single core conductor together and to attach under pressure and fix the terminal to a terminal part of the electric wire,
- and when the electric wire is formed with the multi-core electric wire, the multi-core conductor exposed by removing the coat is set on the bottom plate part of the first electric wire connecting part, and then, the first pair of electric wire caulking pieces of the first electric wire connecting part are bent inside to caulk the electric wire caulking pieces to the multi-core conductor, a part covered with the coat is set on the bottom plate part of the second electric wire connecting part, and then the second pair of electric wire caulking pieces of the second electric wire connecting part are bent inside to caulk the electric wire caulking pieces to the part covered with the coat and to attach under pressure and fix the terminal to the terminal part of the electric wire.

4. A connecting method of a pressure attaching terminal to an electric wire according to claim 3, wherein the single core electric wire is formed with an aluminum single core electric wire having a conductor covered with a coat as an aluminum single core conductor.

5. A method of connecting pressure attaching terminals to electric wires having single and multi core conductors, the method comprising:
- providing a plurality of pressure attaching terminals, each of the plurality of pressure attaching terminals including first and second electric wire connecting parts formed substantially in a U-shape in section in a rear part of the pressure attaching terminal and separated from each other in a longitudinal direction and including a bottom plate part, the first and second electric wire connecting parts having a first pair of electric wire caulking pieces and a second pair of electric wire caulking pieces, respectively, which extend upward from both side edges of the bottom plate part;
- attaching one of the terminals to a wire having a single-core conductor by crimping the first and the second pairs of the electric wire caulking pieces to the single core conductor; and
- attaching another of the terminals to a wire having a multi-core conductor by crimping the first pair of electric wire caulking pieces to the multi-core conductor and the second pair of the electric wire caulking pieces to the coating of the wire.

* * * * *